United States Patent [19]
Moran et al.

[11] Patent Number: 5,809,267
[45] Date of Patent: Sep. 15, 1998

[54] APPARATUS AND METHOD FOR EXECUTING MULTIPLE-CONCATENATED COMMAND GESTURES IN A GESTURE BASED INPUT SYSTEM

[75] Inventors: Thomas P. Moran, Palo Alto; Patrick Chiu, Menlo Park, both of Calif.

[73] Assignee: Xerox Corporation, Stamford, Conn.

[21] Appl. No.: 618,083

[22] Filed: Mar. 18, 1996

Related U.S. Application Data

[63] Continuation of Ser. No. 175,853, Dec. 30, 1993, abandoned.

[51] Int. Cl.⁶ .................................................. G06F 7/00
[52] U.S. Cl. ................................................ 395/358
[58] Field of Search ................................ 395/339–358; 345/179

[56] References Cited

U.S. PATENT DOCUMENTS

| | | | |
|---|---|---|---|
| 5,231,698 | 7/1993 | Forcier | 395/804 |
| 5,252,951 | 10/1993 | Tannenbaum et al. | 345/156 |

OTHER PUBLICATIONS

'Design Issues for Line–Driven Test Editing/Annotation Systems', Gary Hardock, Graphic Interface 1991, Jun. 1991, pp. 77–84.

"Symbolic Construction of a 2–D Scale–Space Image," IEEE Transactions on Pattern Anaysis and Machine Intelligence, Eric Saund, Aug. 1990, vol. 12, No. 8.

"Issues in Combining Marking and Direct Manipulation Techniques", Gordon Kurtenbach and William Buxton, Nov. 11–13, UIST 1991, pp. 137–144.

aha? InkWriter Quick Reference Guide and Handbook, aha? Software Corporation, Copyright 1993.

*Primary Examiner*—Anton W. Fetting
*Attorney, Agent, or Firm*—Fay, Sharpe, Beall, Fagan, Minnich & McKee

[57] ABSTRACT

A graphical editing system is provided which allows a user to draw number of commonly used gestures called primitive command gestures together in essentially one stroke. The primitive gestures are chosen to represent gestural syntax, analogous to a textual command syntax. The primitive gestures are concatenated. i.e., connected in a series of commands by a gestural operator called a break feature. Every input composite gesture is scanned to detect the break features. When found, the composite gesture is broken up into primitive gestures and each gesture is interpreted and executed in the order in which the individual gestures were drawn. The preferred break feature is sharp angle drawn between consecutive primitive gestures. In a composite gesture consisting of two primitive gestures, one being the selection gesture, the break feature is recognized as any departure from the selection gesture.

5 Claims, 5 Drawing Sheets

APPARATUS AND METHOD FOR EXECUTING MULTIPLE-CONCATENATED COMMAND GESTURES IN A GESTURE BASED INPUT SYSTEM

This application is a continuation of application Ser. No. 08/175,853, filed Dec. 30, 1993, now abandoned.

RELATED APPLICATIONS

This application is related to Ser. No. 07/869,554, filed Apr. 15, 1992, now abandoned, Ser. No. 07/868,559, now U.S. Pat. No. 5,270,972, filed Apr. 15, 1992, Ser. No. 08/101,646, now U.S. Pat. No. 5,553,224, filed Aug. 4, 1993, Ser. No. 08/101,645, now U.S. Pat. No. 5,485,565, filed Aug. 4, 1993 Ser. No. 08/136,360, now U.S. Pat. No. 5,564,112, filed Oct. 14, 1993, entitled Apparatus and Method for Generating Place-holders in a touch based input system, Ser. No. 08/175,850, now U.S. Pat. No. 5,509,114, filed Dec. 30, 1993, entitled Method and Apparatus for Correcting and/or Aborting Command Gestures in a Gesture Based Input System, Ser. No. 08/175,841, now U.S. Pat. No. 5,471,578, filed Dec. 30, 1993, entitled Apparatus and Method for Altering Gestures In a Gesture Based Input System, Ser. No. 08/175,846, now U.S. Pat. No. 5,500,935, filed Dec. 30, 1993, entitled Apparatus and Method for Translating Graphic Objects and Commands with Direct Touch Input In a Touch Based Input System, and Ser. No. 08/176,150, filed Dec. 30, 1993, now abandoned, entitled Apparatus and Method for Supporting the Implicit Structure of Freeform Lists, Outlines, Text, Tables and Diagrams in a Gesture-Based Input System and Editing System, all assigned to the present assignee, the disclosures of which are in their entirety, each specifically incorporated by reference herein.

FIELD OF THE INVENTION

This invention pertains to an information input system and method and more particularly to a "gesture based" graphical input system that receives information by sensing the motion of a stylus, pen, finger or mouse.

BACKGROUND OF THE INVENTION

Computer graphic operations that are initiated by pointing devices are typically two types: drawing operations and control operations. Drawing operations describe loci for the placement of visible marks on the image, analogous to drawing on a piece of paper by making a motion with a pen in contact with the surface. Control operations are used to initiate and guide the execution of computer functions leading to modification of the visible marks. Control operations are especially important to the performance of editing functions such as erasing, moving, or changing the visual qualities (e.g. line width) of visible marks of the image.

It is noted that the basic function of gesture-based input such as a pen-based notebook computer or the Liveboard is to allow the user to make freehand marks by simply drawing ("inking") them. Such a mark is then a data object in the system. Operations can then be performed on these objects by particular control functions known as gestures. A gesture is a hand-drawn command and it is a mark created with a stylus input device that is interpreted by the system as designating an action for the system to perform. In order to institute a simple control command by gesture, the user would draw a gesture which represents some desired function and then commit to the command by lifting the input device (e.g. stylus) from the input surface of a display or releasing a button on the device (e.g. mouse). That is, the completed gesture is sensed and after lifting the stylus from the input surface of the display the computer is instructed to execute the particular command.

In the "whiteboard" system for the Liveboard, gestures have been frequently used as the preferred procedure for issuing many commands on the input surface of the display. One example of a command is the selection gesture. There are many types of command gestures for selecting objects written by a user. The most common is a loop gesture in which objects are selected by drawing a circle around such objects by a freeform gestural stroke. FIG. 2 illustrates such a freeform loop selection at 32. A plurality of objects drawn on display screen 14 are selected for future operation by encircling such objects with freeform loop selection 32.

Once selected, other gestures can operate on the selected objects. In some instances, this previously described sequence of events, i.e., (1) selecting specified objects, (2) pausing between selection and subsequent operation, and (3) and executing subsequent operations on selected objects, is desirable because a user has the option of editing or modifying his/her selection. The act of selecting is often times complex enough to require a user's complete attention. Once selected, the user can then perform other operations on the selected objects. In the preferred system, the selection is maintained after an operation so several operations can be performed until the user achieves what is intended.

In many other cases where the selection is simple, a user may desire to save time, i.e., eliminate the pause between selecting objects and subsequent operation by combining or concatenating two or more gestures in essentially one stroke. That is, the user may wish to draw a "composite" gesture, i.e., a number of separate individual gestures combined or connected in series to perform a number of desired functions in sequence, much like that procedure used with several text commands. In a text command environment, text commands are combined to create a command sequence in which a number of desired functions are performed to specified data. The textual commands connected in series are separated by punctuation, e.g., semi-colons. The punctuation is then detected to separate individual textual commands. Such commands are then interpreted and executed in the sequence drawn.

In a gesture based input system, it would also be desirable to concatenate a number of separate individual gestures in one stroke to perform a number of desired functions.

OBJECTS AND SUMMARY OF THE INVENTION

It is an object of the present invention to allow a user to combine a number of single stroke gestures into one compound single stroke gesture to perform a number of desired functions.

The above object is achieved in accordance with the present invention by a a system which allows a user to draw a number of gestures called primitive gestures together in essentially one stroke. The combination of primitive gestures is called a composite gesture. The primitive gestures constitute a basic vocabulary of gestures, i.e., each primitive gesture has a well defined meaning.

The primitive gestures can be concatenated. i.e., connected in a series of commands. Some gestures have easily recognized shapes, so that their beginning and endpoints can be detected in a composite gesture. However, most primitive gestures are difficult to isolate in a composite gesture. To deal with this, the primitive gestures are connected in series using a gestural operator called a "break" feature. The composite gesture is scanned to detect the break features or the beginnings and ends of such gestures connected without the break feature. When found, the composite gesture is broken up into primitive gestures and each gesture is interpreted and executed in the order in which the individual gestures were drawn. The advantage of a distinct break feature is that new primitive gestures added to the user interface can be combined with existing gestures in any way needed by the user.

The preferred break feature is a sharp or acute angle drawn between consecutive primitive gestures.

In the special case where the first primitive gesture in a composite gesture is a selection gesture, the break feature may be recognized as any departure from the selection gesture.

In accordance with the present invention, a graphic editing system is provided which comprises a data interface surface having identifiable coordinates, and an application program including means for displaying data on said surface, means for interacting with said surface to control said application, and to modify said data displayed on said surface. The system also includes means to generate a composite stroke on said surface, said composite stroke including a plurality of gestures, with each representing a specified display operation on said surface, and means responsive to generating said composite stroke for executing each of said plurality of gestures.

In accordance with an aspect of the invention, a graphic editing system is provided which comprises a data interface surface having identifiable coordinates, and an application program including means for displaying data on said surface, and means for interacting with said surface to control said application, and to modify said data displayed on said surface. Means are also provided to generate a composite stroke on said surface. The composite stroke includes a plurality of gestures, each representing a specified operation, and at least one break feature for separating consecutive gestures of said plurality of gestures. The graphic editing system further comprises means responsive to generating said composite stroke for executing each of said plurality of gestures with said executing means including means for detecting said break features.

In accordance with another aspect of the invention, a graphic editing system is provided which comprises a data interface surface having identifiable coordinates, and an application program including means for displaying data on said surface, means for interacting with said surface to control said application, and to modify said data displayed on said surface. Means are also provided to generate a composite stroke on said surface, said composite stroke including first and second consecutive gestures, each representing a specified command for modifying said data displayed on said surface. The composite stroke further includes means for separating said consecutive gestures of said plurality of gestures, and means responsive to generating said composite stroke for executing each of said plurality of gestures, said executing means including means for detecting said separating means.

In accordance with another aspect of the invention, a graphic editing system is provided which comprises a data interface surface, and an application program including means for displaying data on said surface, means for interacting with said surface to control said application, and to modify said data displayed on said surface. The system also includes means to generate a composite stroke on said surface, said composite stroke including first and second commands, each having a defined shape, and means responsive to generating said composite stroke for detecting each shape of said first and second gestures.

In accordance with another aspect of the invention, a method for graphical editing is provided for a system which includes a data interface surface and an application program including means for displaying data on said surface and means for interacting with said surface to control said application and to modify said data displayed on said surface. The method comprises the steps of generating a composite stroke on said surface including plurality of gestures, each representing a specified command for modifying said data displayed on said surface, and executing each of said plurality of gestures in response to generating said composite stroke.

BRIEF DESCRIPTION OF THE DRAWINGS

The invention is illustrated by way of example and not limited by the figures of the accompanying drawings in which like references denote like or corresponding parts and in which.

DESCRIPTION OF THE PREFERRED EMBODIMENT

Figure 1:
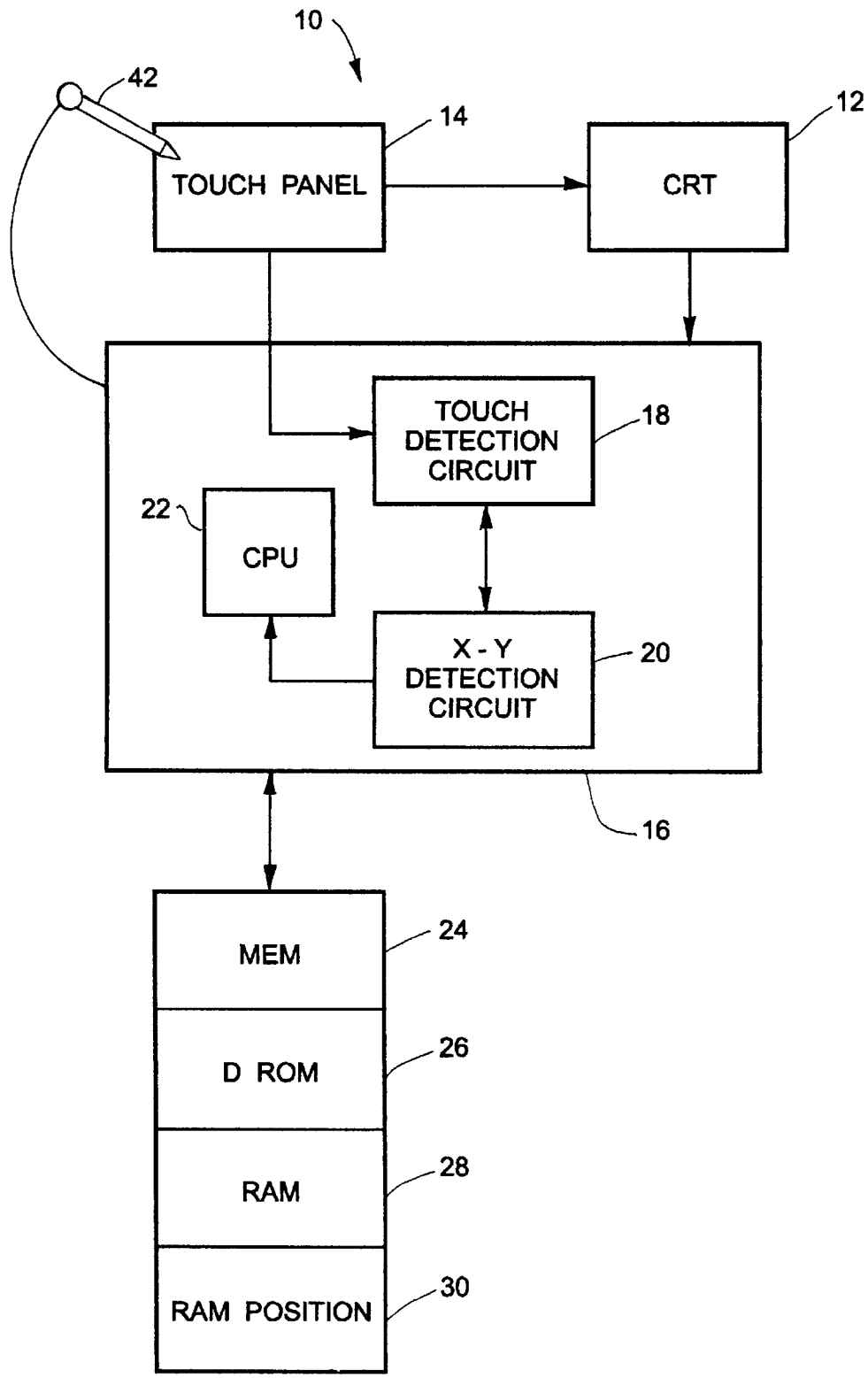
FIG. 1 is a block diagram illustrating one form of touch based input apparatus in which the system according to the present invention can be employed.

Referring to FIG. 1, there is shown a block diagram of the touch based input system 10 including a CRT display 12. A touch sensitive panel 14 is attached onto the surface of CRT display 12. Touch panel 14 is adapted to be touched by a user and such touch is detected by touch detection circuit 18. A detection signal corresponding to the position of the touched input point is output from touch detection circuit 18 in a controller 16.

The detected signal from touch detection circuit 18 is input to an X-Y detection circuit 20. X-Y detection circuit 20 processes the input signal and performs an arithmetic operation or the like. Thus, the X-Y detection circuit 20 detects the (x, y) coordinates of the input point touched on the surface of touch panel 14 and transmits such information to CPU 22. Touch panel detection circuit 18, X-Y detection circuit 20 and the CPU 22 combine to form controller 16. Controller 16 performs the control in accordance with the control program stored in program ROM 26 in memory 24. ROM section in memory 24 includes program ROM 26 in which the control program of CPU 22 is stored and pattern data area to store various kinds of character patterns or the like. RAM section 28 of memory 24 includes a RAM portion which is used as a work area of CPU 22 and a character position data area 30 to store display positions of character patterns and the like.

Figure 2:
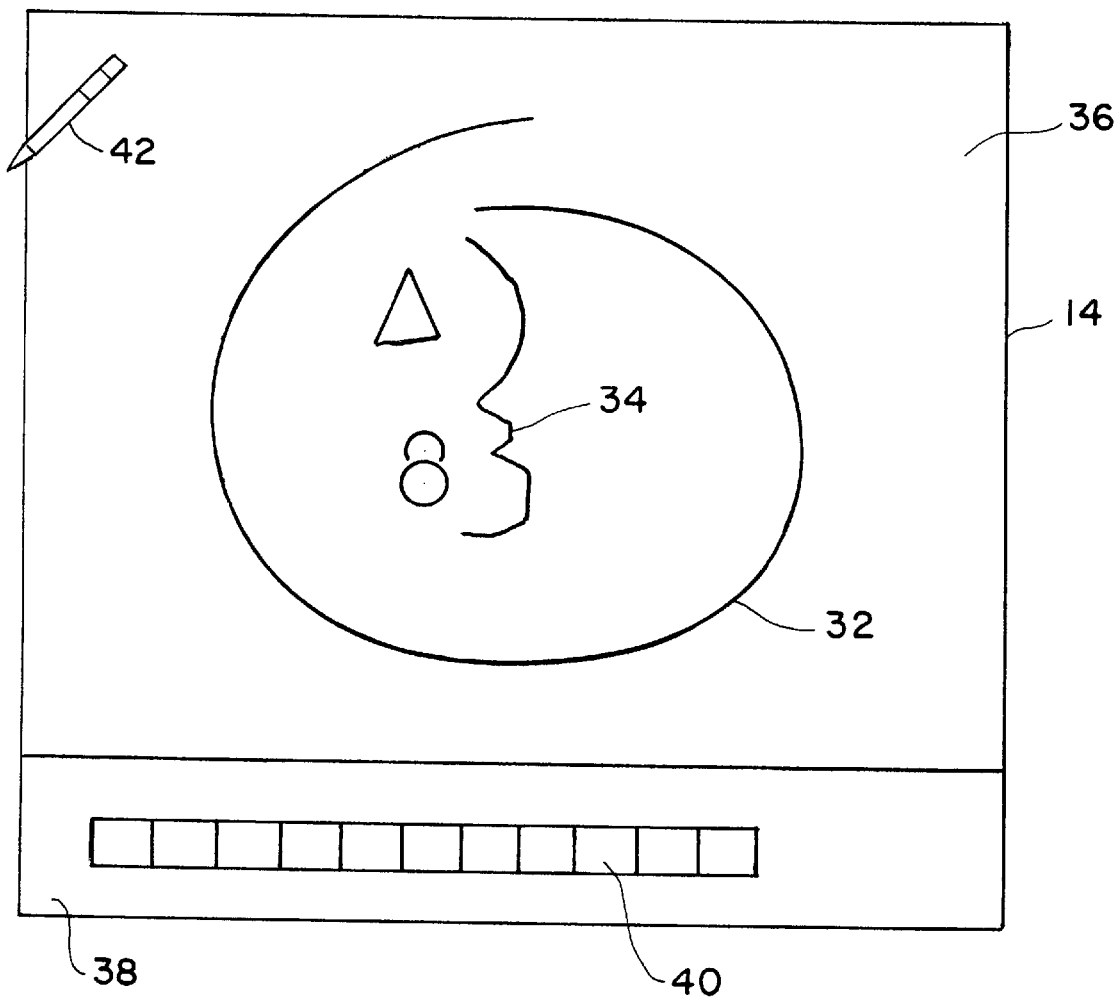
FIG. 2 is an elevational view of a display screen with a loop gesture enclosing several objects.

Specifically, in FIG. 2, touch panel 14 is an electronic input and display device such as an electronic sketch pad, liveboard or white board which employs a working surface and may employ a plurality of accessible functions 40 as is shown. The working surface is the upper area 36 of touch panel 14 and accessible functions 40 are displayed at the bottom area 38 of touch panel 14. These functions 40 may include new operation (draw mode), delete, move, shrink and so on which may be invoked by touching the respective display area. Alternatively, these functions can be accessed by a pie-menu. These functions however are optional in designation, their principal objects being to define operations which are inherent in the operation of the system. These functions may share the some of the same functions that are represented by many designated command gestures.

A suitable user manipulable control or interacting device such as a stylus or light pen or the like 42 is employed to draw input symbols, select functions or draw gestures representative of specified functions. Obviously, other variants within the skill of the art may be employed.

In FIG. 2 the user has created objects 34 and has selected these objects by drawing a freeform selection stroke 32 around them.

Figure 3:
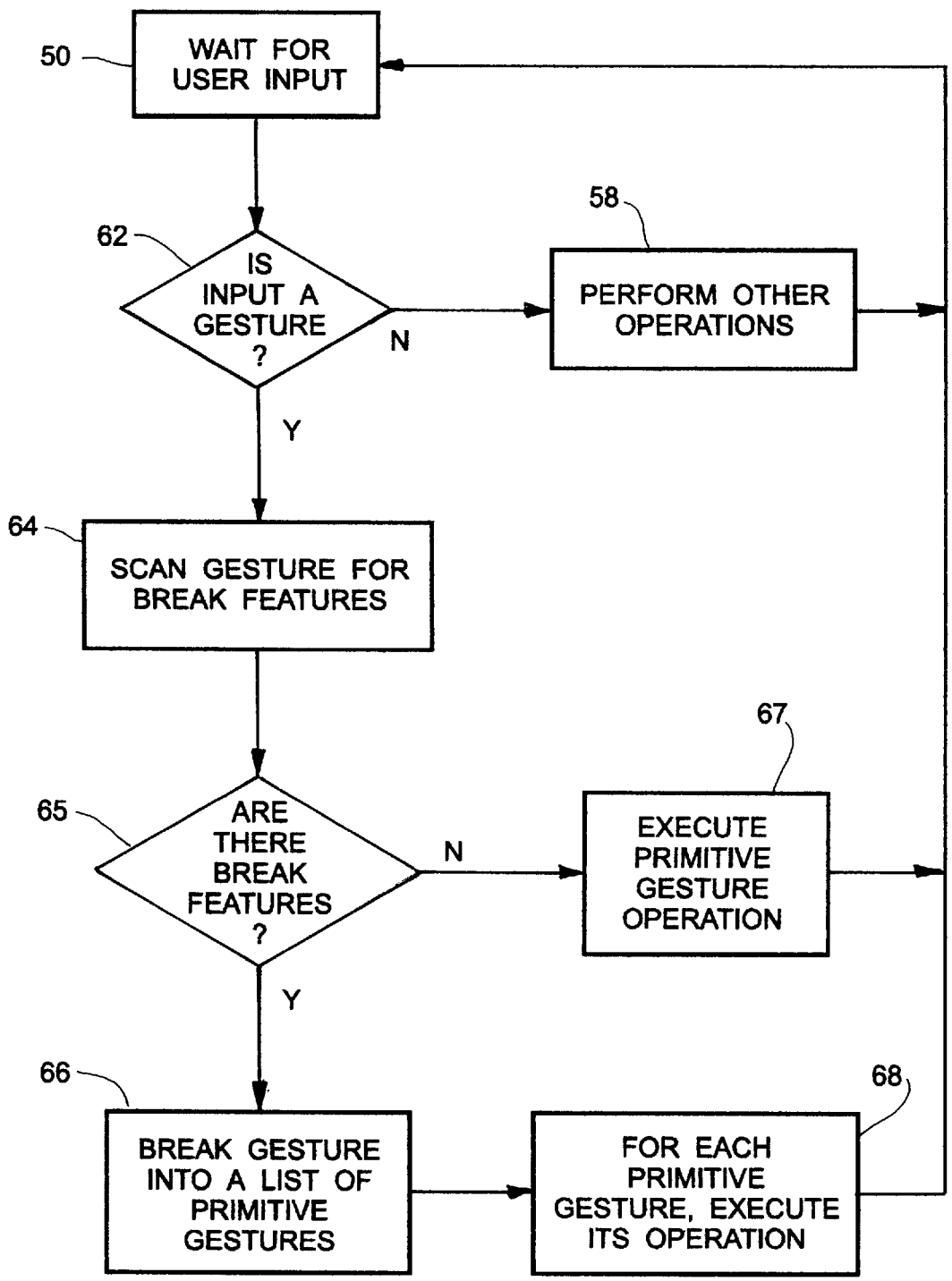
FIG. 3 is a flowchart showing the sequence of operations for object manipulation.
Figure 4A:
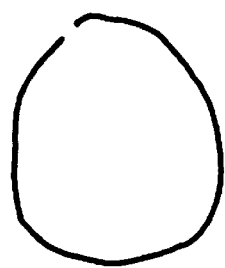
FIGS. 4a–d illustrate four primitive command gestures used as the basic tokens of gestural syntax.
Figure 4B:
Figure 4C:
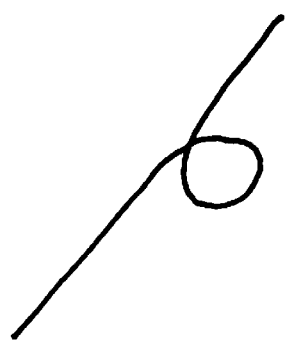
Figure 4D:

A drawing editing application may incorporate the present invention by making use of the following user object operations as illustrated in FIG. 3 wherein a prototypical control structure for a computer-assisted graphical editing tool incorporating the invention is shown. The sequence of operation is as follows.

When touch panel 14 is in DRAW mode, the system waits for input on touch panel 14 from a user. The user can draw strokes on touch panel 14 to input data or enter a gesture command.

At decision diamond 62 the system determines if the input is a gesture by detecting some action taken on the part of the user. In the preferred embodiment, the user may inform the system of a gesture by pressing or exerting pressure on a button located on the stylus. However, there are other means available to signal the system that a gesture is being entered. If the input is not a gesture then the system performs other operations on desired data at block 58, and then the system returns to block 50 and waits for further input from the user.

If however a gesture stroke is detected, the stroke is scanned for the break features at decision diamond 65. If no break features are detected, the system will execute the primitive gesture operation. If at least one break feature is detected, then the system breaks the gesture into primitive gestures at block 66. Then the system interprets each primitive gesture as an operation, one after another, i.e., in the order in which they were drawn by the user. As each gesture is interpreted, the operation associated with each is executed at block 67. The system then returns to block 50 to wait for input.

Figure 5A:
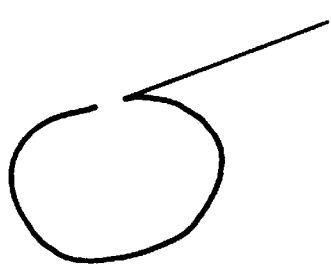
FIGS. 5a and 5b illustrate two different composite gestures consisting of two primitive gestures concatenated using the break feature in accordance with present invention.
Figure 5B:

FIGS. 4a–d show four primitive gestures: select 70 (freeform loop around the data to be selected), select list item 72 (a bracket to the left of the list item to be selected), delete 74 (pigtail shape), and move 76 (a line beginning at a selection enclosure and ending at the new location) respectively. The user can combine any selection gesture with any one of the operation gestures. A break feature can be generally defined as any departure from the shape of the selection gesture. Thus, for example, as shown in FIGS. 5a and 5b, the user can draw in a single stroke a selection gesture 70 and a move gesture 76 shown in FIGS. 4a and 4d respectively or select a listed item 72 and delete it 74.

Figure 6A:
FIGS. 6a and 6b illustrate two additional primitive gestures.
Figure 6B:
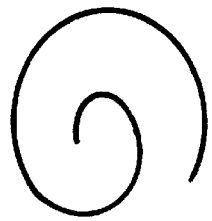
Figure 7:
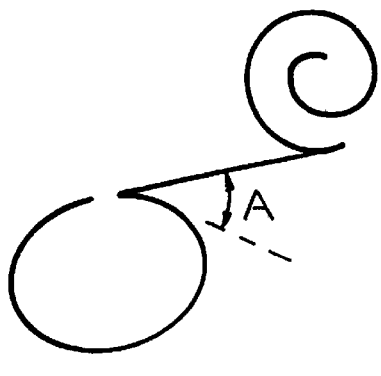
FIG. 7 shows a composite gestural stroke consisting of the primitive gestures shown in FIGS. 4a, 4d and 6b which are concatenated by incorporating the preferred embodiment of the break feature according to the present invention.

FIGS. 6a and 6b show two additional primitive gestures: copy 78 (a C at the end of the move line gesture) and shrink 80 (a spiral shape) respectively. These two additional gestures can be combined with the existing primitive gestures shown in FIGS. 4a–d to allow a number of select-operate composite gestures and many more possible combinations can be formed by concatenating several operation gestures. For example, as is shown in FIG. 7, data (not shown) can be selected by freeform selection gesture 70, moved by gesture 76 and then shrunk by gesture 80 by means of a single composite gesture. While each of the above composite gestures contains a selection gesture in order to provide an object upon which the operation command gestures operate, it is apparent that composite gestures need not necessarily employ such a selection gesture. For example, in FIG. 7, if the information was previously selected 70, then a composite gesture consisting of only move 76 and shrink 80 could be applied to the selection.

Figure 8:
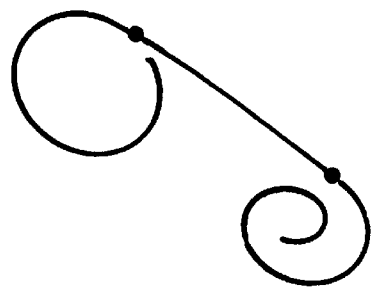
FIG. 8 illustrates two primitive gestures concatenated by incorporating another embodiment of the break feature according to the present invention.

In FIG. 7, a sharp angle (A) is used as the break feature. The sharp angle is used as the preferred break feature since it is more natural and faster to draw. The sharp angle however may be disadvantageous because it prevents certain primitive gestures from being included, such as a scratchout gesture which has several sharp angles within it. Another preferred break feature is a large dot (or "fat dot") 82. See FIG. 8. This break feature does not have the restrictions of the sharp angle feature, but it is somewhat slower to perform.

It is noted that break features can be context independent or, to varying degrees, context dependent. A break feature is completely context independent if it can be recognized by the system in any composite input gesture without making any assumptions about the content of the gesture. For example, the "fat dot" feature would work as a context independent break feature over a set of primitive gestures that contained no "fat dots" themselves or any other kind of similar symbol that might be confused as a "fat dot."

Figure 9A:
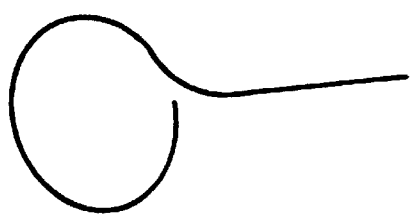
FIGS. 9a and 9b illustrate two composite gestures consisting of two concatenated primitive gestures.
Figure 9B:

On the other hand, an example of context dependence is an assumption that a selection gesture is always the first gesture in a composite gesture. This may avoid confusion between break feature and command gesture. If the system incorporates this assumption, then the break feature after a loop is any departure from the loop (sharp corner or no sharp corner). For example, the two gestures in each of FIGS. 9a and 9b are recognized as a selection plus a move gesture.

Ideally, a context independent break feature is preferred. But the tradeoff of simplicity for this ideal may be speed and/or restrictions on the particular gesture set.

Although the invention has been described with reference to preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

We claim:

1. A computer-implemented graphic editing system comprising:
   (a) a computer,
   (b) a display under control of the computer,
   (c) a computer application program including means for displaying on the display data operated on by the application program,
   (d) a user-operated pointing device coupled to the display under control of the computer,
   (e) means in the computer for recognizing gestures made by the pointing device when manipulated by a user,
   (f) means for storing in the computer a library of primitive gestures and at least one break gesture that can be made with the pointing device, each of said primitive gestures representing an individual operator command to the computer to execute a specific command to edit the data displayed on the display in a specific manner,
   (g) means in the computer for comparing each recognized gesture with the library of primitive gestures and at least one break gesture to determine whether any of the recognized gestures represent a primitive gesture or break gesture and to identify each said primitive gesture,
   (h) means for storing in the computer a compound gesture inputted with the pointing device in a single continuous stroke, the compound gesture being comprised of at least first and second primitive gestures corresponding to primitive gestures stored in the library and further comprised of the break gesture which is drawn between the first and second primitive gestures on the display in a shape distinct from the shape of the first and second primitive gestures; and
   (i) means in the computer for first executing, after the inputting of the compound gesture, the command represented by the first primitive gesture and then executing the command represented by the second primitive gesture.

2. The system according to claim 1, wherein said break gesture is an acute angle between the first and second primitive gestures.

3. The system according to claim 1, wherein said break gesture is a fat dot between the first and second primitive gestures.

4. The system according to claim 1, wherein the primitive gestures represent selection, move, copy and shrink.

5. A method for graphical editing in a computer-implemented graphic editing system comprising:
   (a) a computer,
   (b) a display under control of the computer,
   (c) a computer application program including means for displaying on the display data operated on by the application program,
   (d) a user-operated pointing device coupled to the display under control of the computer,
   (e) means in the computer for recognizing gestures made by the pointing device when manipulated by a user,
   (f) means for storing in the computer a library of primitive gestures and at least one break gesture that can be made with the pointing device, each of said primitive gestures representing an individual operator command to the computer to execute a specific command to edit the data displayed on the display in a specific manner,
   (g) means in the computer for comparing each recognized gesture with the library of primitive gestures and at least one break gesture to determine whether any of the recognized gestures represent a primitive gesture or break gesture and to identify each said primitive gesture; and
   (h) means for storing in the computer a compound gesture inputted with the pointing device in a single continuous stroke, the compound gesture being comprised of at least first and second primitive gestures corresponding to primitive gestures stored in the library and further comprised of the the break gesture which is drawn between the first and second primitive gestures on the display in a shape distinct from the shape of the first and second primitive gestures;
   said method comprising the steps of:
   (A) manipulating said pointing device to generate said compound gesture in a single continuous stroke,
   (B) identifying the first and second primitive gestures and break gesture of step (A), and
   (C) first executing the command represented by the the first primitive gesture identified in step (B) and then executing the command represented by the second primitive gesture identified in step (B).

* * * * *